United States Patent
Seo et al.

(10) Patent No.: US 6,208,688 B1
(45) Date of Patent: Mar. 27, 2001

(54) METHOD OF SELECTING A REQUANTIZATION STEP SIZE AND CONTROLLING A BIT-RATE

(75) Inventors: Kwang Deok Seo; Jae Kyoon Kim; Jong Seog Koh, all of Taejeon (KR)

(73) Assignees: Korea Telecom, Seoul; Korea Advanced Institute of Science and Technology, Taejeon, both of (KR)

( * ) Notice: Subject to any disclaimer, the term of this patent is extended or adjusted under 35 U.S.C. 154(b) by 0 days.

(21) Appl. No.: 09/201,120

(22) Filed: Nov. 30, 1998

(30) Foreign Application Priority Data

May 29, 1998 (KR) .................................................. 98-19935

(51) Int. Cl.⁷ ................................. H04B 1/66; H04N 7/12
(52) U.S. Cl. ........................................................ 375/240.03
(58) Field of Search ............................ 348/400.1, 403.1, 348/405.1, 413.1, 415.1, 416.1, 409.1; 364/514, 572; 341/61; 375/240, 240.06, 245, 240.03; H04N 7/12; H04B 1/66

(56) References Cited

U.S. PATENT DOCUMENTS

| | | | |
|---|---|---|---|
| 5,537,440 | * 7/1996 | Eyuboglu et al. | 375/245 |
| 5,541,852 | * 7/1996 | Eyuboglu et al. | 364/514 |
| 5,617,142 | * 4/1997 | Hamilton | 348/405 |
| 5,623,312 | * 4/1997 | Yan et al. | 348/416 |
| 5,657,015 | * 8/1997 | Nakajima et al. | 341/61 |
| 5,687,095 | * 11/1997 | Haskell et al. | 364/514 |
| 5,692,102 | * 11/1997 | Pan | 395/2.39 |
| 5,781,452 | * 7/1998 | Lee et al. | 364/572 |
| 5,870,146 | * 2/1999 | Zhu | 348/409 |
| 5,889,561 | * 3/1999 | Kwook et al. | 345/405 |

OTHER PUBLICATIONS

Wrner, O, Requantization for Transcoding of MPEG–2 Interframes, Image Processing, IEEE transactions on, Vol. 8 Issue: 2, pp. 179–191, Feb. 1999.*

Nakajima et al., Rate conversion o f MPEG coded video by re–quantization process, Image processing, International Conference, pp. 408–411, vol. 3, 1995.*

* cited by examiner

*Primary Examiner*—Chris S. Kelley
*Assistant Examiner*—Tung Vo
(74) *Attorney, Agent, or Firm*—Staas & Halsey LLP

(57) ABSTRACT

A method selects a requantization step size which abruptly changes a bit-rate in a piecewise linearly decreasing model and controls the bit-rate. The method includes: deciding a minimum value of the requantization step size Q2, satisfying $2 \cdot Q1 + nint(p \cdot Q2/q) < 2 \cdot Q2$ for a quantization step size Q1 of a coded image block of a video image, as requantization step size information; determining a minimum value of a requantization step size Q2, satisfying $4 \cdot Q1 + nint(p \cdot Q2/q) < 2 \cdot Q2$ for the quantization step size Q1 of the coded image block, as the requantization step size information; taking a minimum value of a requantization step size Q2, satisfying $3 \cdot Q1 < 2 \cdot Q2$ for the quantization step size Q1 of the coded image block, as the requantization step size information; and choosing a minimum value of a requantization step size Q2, satisfying $5 \cdot Q1 < 2 \cdot Q2$ for the quantization step size Q1 of the coded image block, as the requantization step size information, wherein $nint(\cdot)$ is a nearest integer operator and p and q represent positive integers, respectively.

9 Claims, 12 Drawing Sheets

FOR Q1=4

FIG. 5

|    |    |    |    |    |    |    |    |
|----|----|----|----|----|----|----|----|
| 8  | 16 | 19 | 22 | 26 | 27 | 29 | 34 |
| 16 | 18 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

METHOD OF SELECTING A REQUANTIZATION STEP SIZE AND CONTROLLING A BIT-RATE

FIELD OF THE INVENTION

The present invention relates to a video signal transcoder; and, more particularly, to a method of selecting a requantization step size which abruptly changes a bit-rate in a piecewise linearly decreasing model and controlling the bit-rate.

DESCRIPTION OF THE PRIOR ART

In the future, most of video services will be achieved based on MPEG (Moving Picture Experts Group) phase 2(MPEG-2) which performs compression or reduction of a volume of video data through the use of various data compression techniques. A typical one of the video services is a video on demand (VOD).

However, the video service employing MPEG-2 has a problem in that characteristics of a bandwidth of a channel which transmits the video data cannot be regarded in advance when the video data is compressed and stored. This problem is clearer when the video data is transmitted via channels having different bandwidths. That is, if a bandwidth of a channel is narrower than a bit-rate of the compressed video data, it may not be guaranteed to achieve good service. Also, it is difficult to get video data which is compressed in various bit-rates corresponding to bandwidths of various channels.

In order to overcome the drawbacks, a method of converting a bit-rate by using a bit-rate converter disposed between a video server and a user has been proposed. That is, in order to give a good service to a user who wants to get video data which is compressed in a high bit-rate and is to be transmitted in a low bit-rate, it is necessary to render the bit-rate converter. As a result, a transcoder has been introduced.

The conventional transcoder uses a requantization method so as to convert a bit-rate and utilizes a conventional MPEG-2 Test Model 5 (TM5) in order to control the bit-rate.

However, if the conventional TM5 method is used in controlling the bit-rate, there are problems. That is, quantization step size information obtained from an input bitstream coupled to the transcoder cannot be sufficiently utilized and a target bit amount cannot be achieved.

In addition, in the case of controlling the bit-rate by using the TM5 method after the input bitstream, which has been processed by using image quality improving techniques such as a scene change and adaptive quantization techniques, being fed to the transcoder, there is a problem that additional image quality improving techniques should be employed.

SUMMARY OF THE INVENTION

It is, therefore, an object of the invention to provide a requantization step size selecting method of determining a requantization step size which abruptly changes a bit-rate in a new model established as a base capable of encoding video data in a target bit-rate and a bit-rate control method for effectively regulating a bit-rate by using the selecting method.

In accordance with one aspect of the present invention, there is provided a method of selecting a requantization step size, which comprises: (a) deciding a minimum value of a requantization step size Q2, satisfying $2 \cdot Q1+\text{nint}(p \cdot Q2/q) < 2 \cdot Q2$ for a quantization step size Q1 of a coded image block of a video image, as requantization step size information; (b) determining a minimum value of a requantization step size Q2, satisfying $4 \cdot Q1+\text{nint}(p \cdot Q2/q) < 2 \cdot Q2$ for the quantization step size Q1 of the coded image block, as the requantization step size information; (c) taking a minimum value of a requantization step size Q2, satisfying $3 \cdot Q1 < 2 \cdot Q2$ for the quantization step size Q1 of the coded image block, as the requantization step size information; and (d) choosing a minimum value of a requantization step size Q2, satisfying $5 \cdot Q1 < 2 \cdot Q2$ for the quantization step size Q1 of the coded image block, as the requantization step size information, wherein $\text{nint}(\cdot)$ is a nearest integer operator and p and q represent positive integers, respectively.

The method in accordance with one aspect of the present invention further comprises redetermining the requantization step size information by subtracting a predetermined value from the requantization step size information determined in the preceding steps.

In accordance with another aspect of the present invention, there is provided a method, for use in a bit-rate controller, for controlling a bit-rate, comprising: (a) initializing a variable and detecting a region to which a normalized bit rate for an input image belongs; (b) calculating requantization step size information by using each linear equation according to the detecting result of the step (a) based on quantization step size information Q1 of the input image; and (c) requantizing and encoding each of macroblocks based on the requantization step size information assigned to each of the macroblocks.

The method in accordance with one aspect of the present invention further comprises updating the variable for a following slice and then repeating the steps of (a) to (c).

BRIEF DESCRIPTION OF THE DRAWINGS

The above and other objects and features of the present invention will become apparent from the following description of preferred embodiments given in conjunction with the accompanying drawings, in which:

FIG. 5 provides a quantization matrix for an intra mode block and shows a zig-zag scanning thereof;

DETAILED DESCRIPITON OF THE PREFERRED EMBODIMENTS

Embodiment of the present invention will be illustrated in detail with reference to the accompanying drawings.

Figure 1:
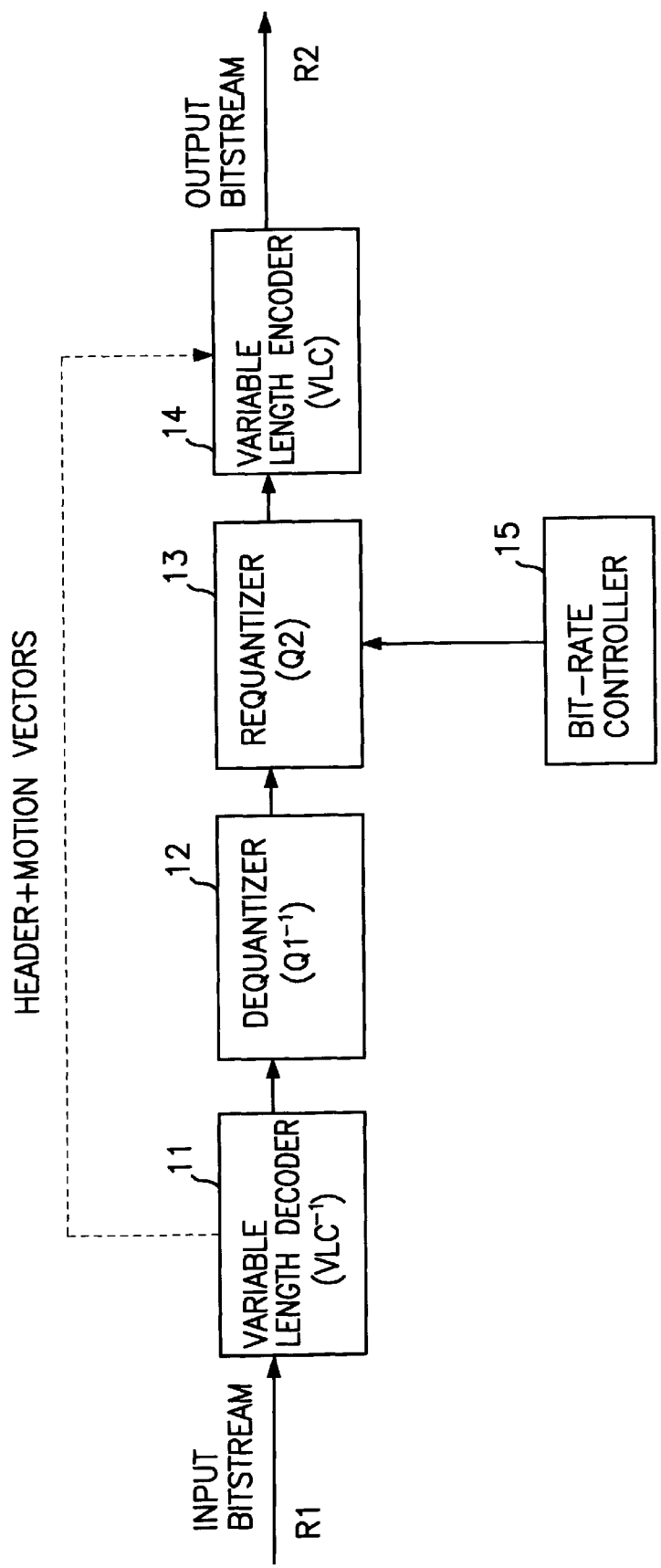
FIG. 1 represents an exemplary block diagram of a transcoder using requantization characteristics in accordance with the present invention.
Figure 2A:
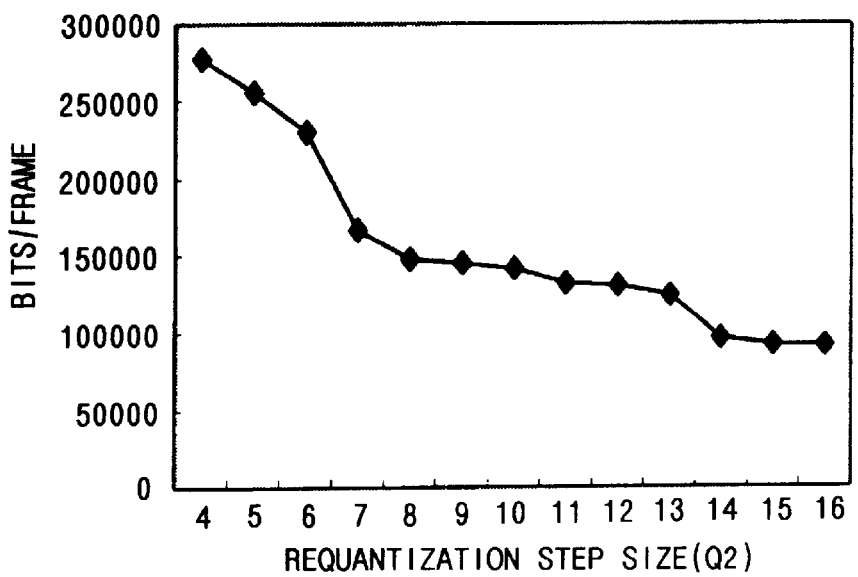
FIGS. 2A to 2D illustrate bit-rate reduction characteristics for an I frame of a "Flower Garden" image when a requantization for the I frame is performed, respectively.
Figure 2B:
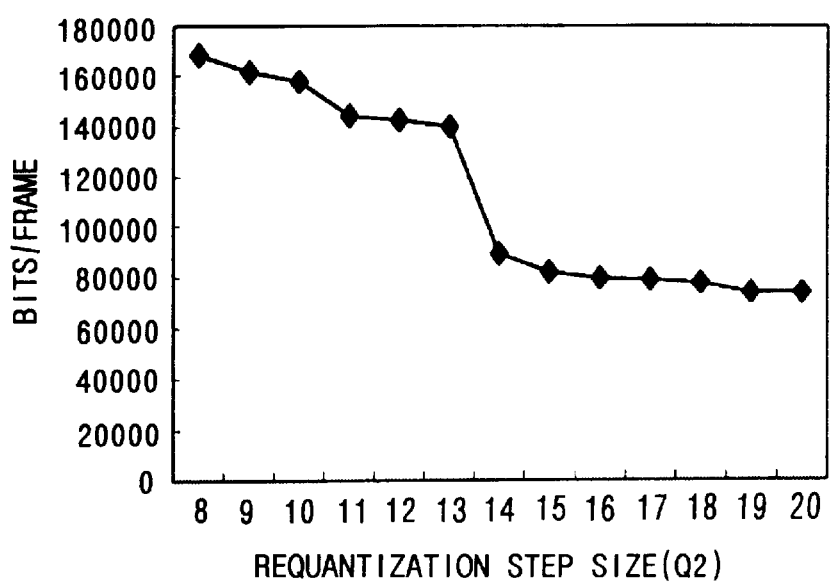
Figure 2C:
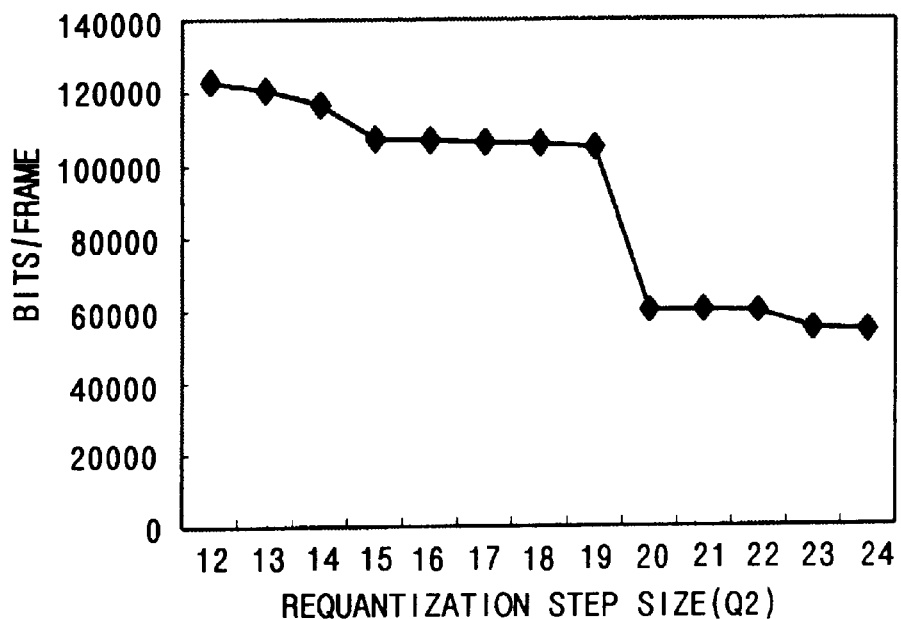
Figure 2D:
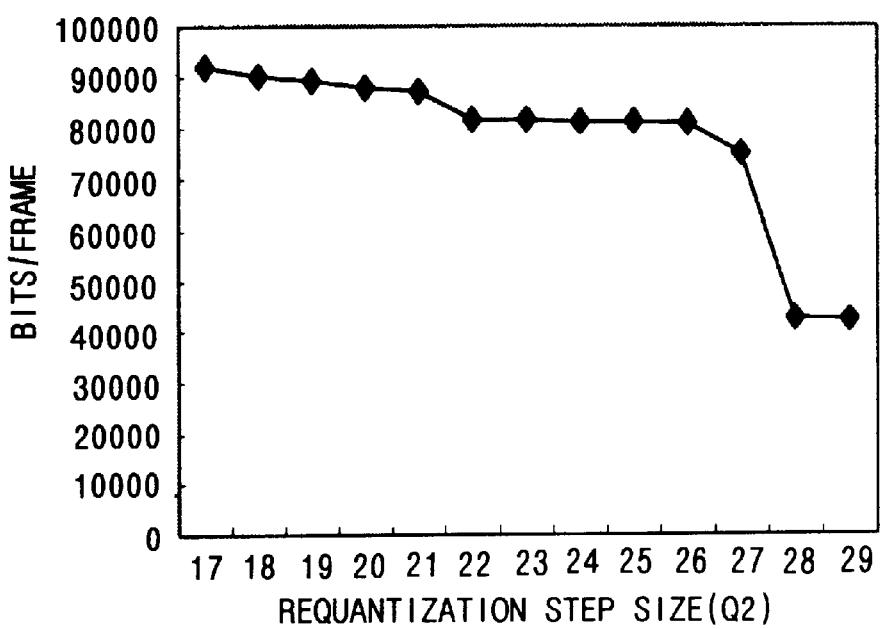
Figure 3A:
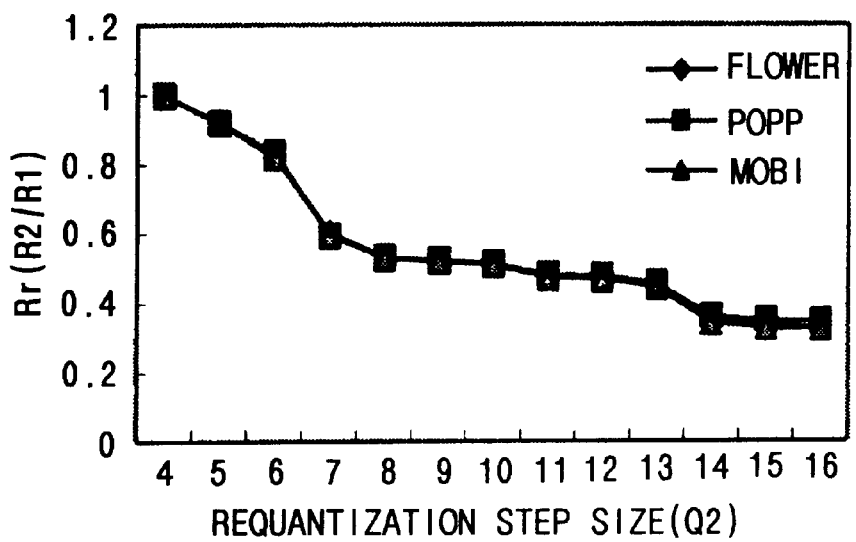
FIGS. 3A to 3D describe bit-rate reduction characteristics for I frames of various images, respectively.
Figure 3B:
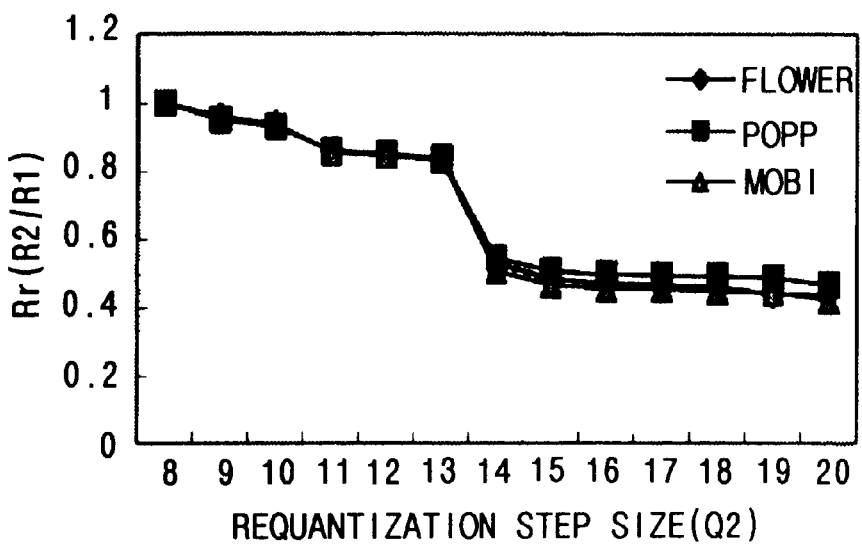
Figure 3C:
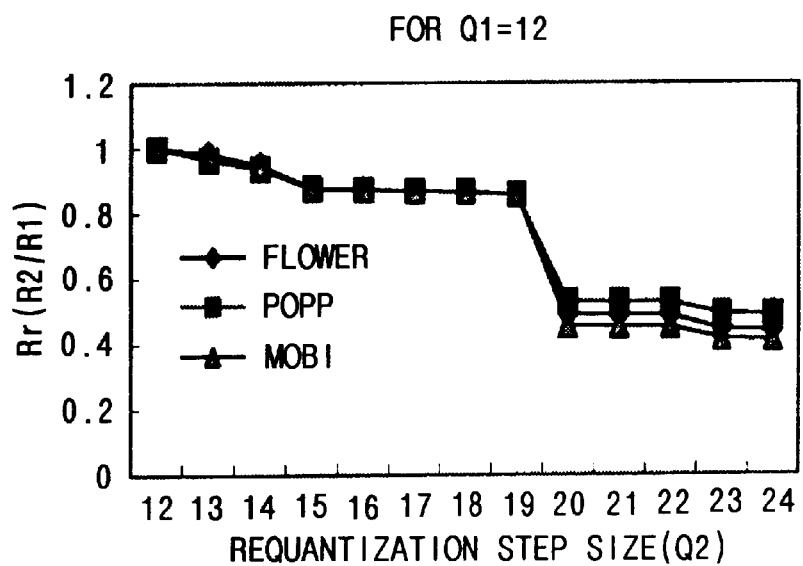
Figure 3D:
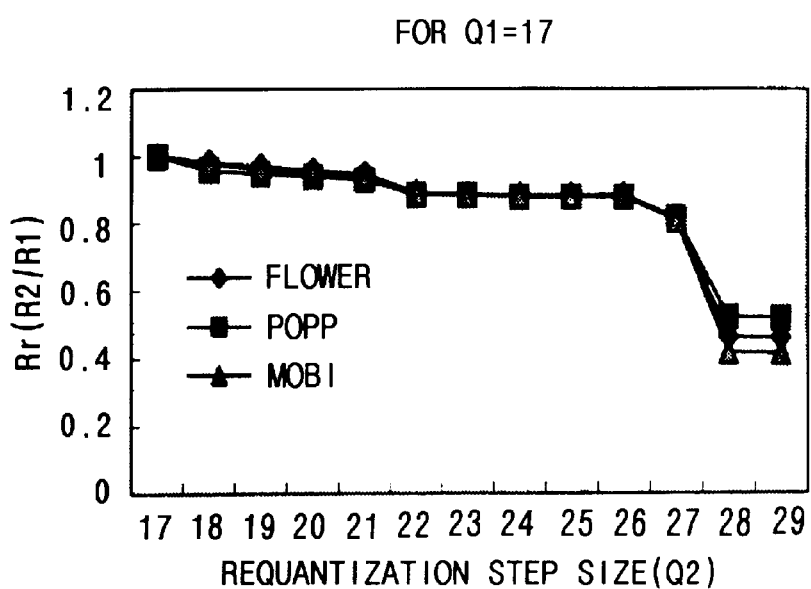
Figure 4A:
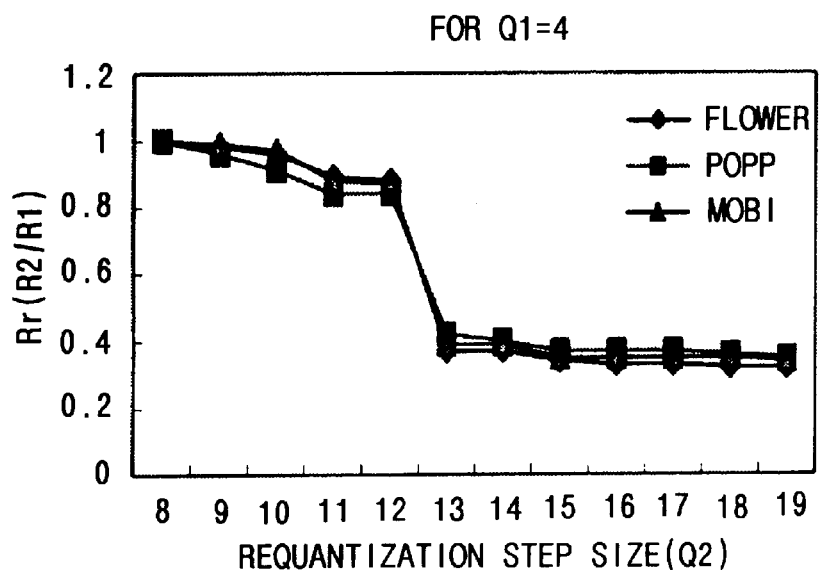
FIGS. 4A to 4D show bit-rate reduction characteristics for P frames of various images, respectively.
Figure 4B:
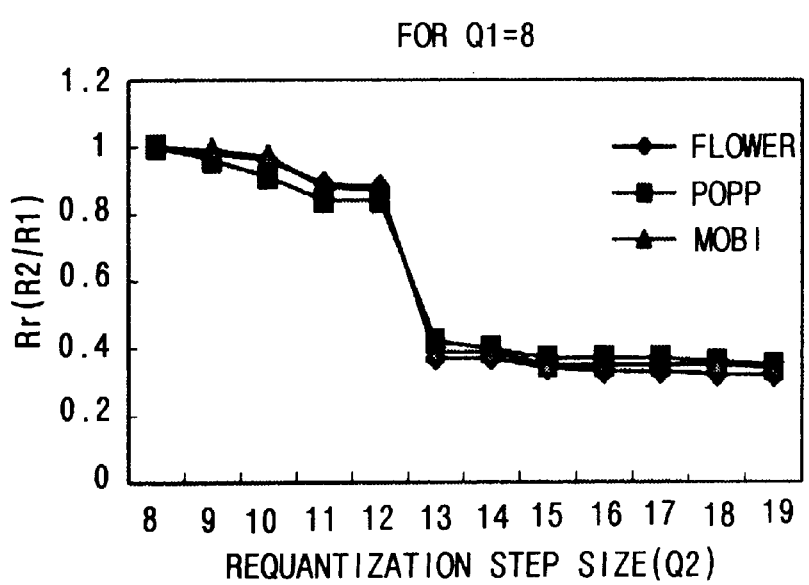
Figure 4C:
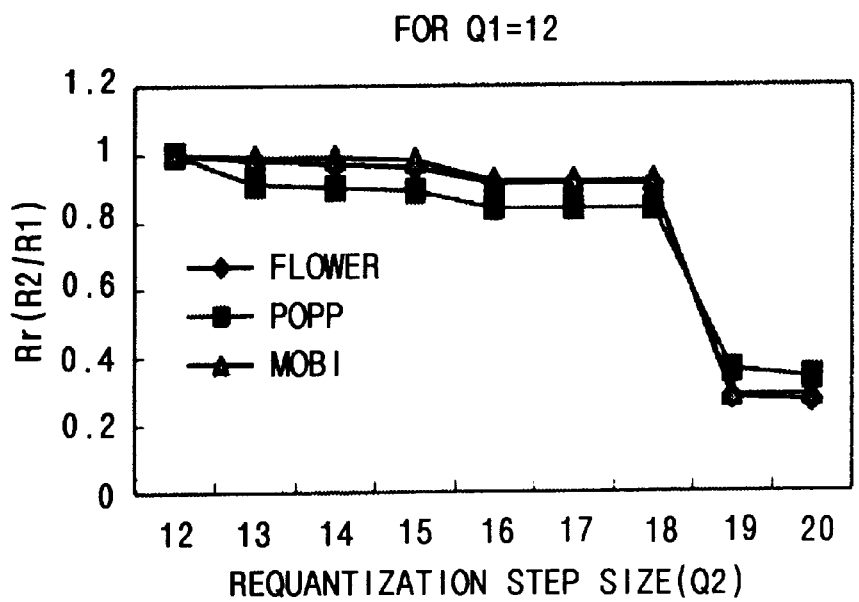
Figure 4D:
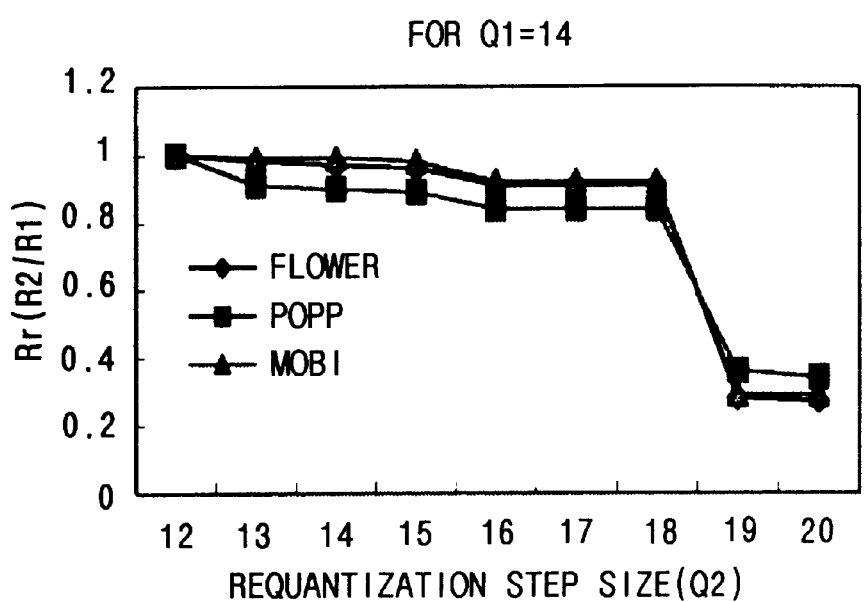

Referring to FIG. 1, there is provided a block diagram of a transcoder using requantization characteristics in accordance with the present invention.

In FIG. 1, R1 and R2 denote a bit-rate of an input bitstream and that of an output bitstream, respectively, wherein R1 is greater than R2, and a VLC block and a $VLC^{-1}$ block represent a variable length coder 14 and a variable length decoder 11, respectively. A $Q1^{-1}$ block stands for a dequantizer for dequantizing an input bitstream with quantization step size Q1. A Q2 block shows a requantizer 13 which requantizes the output from the dequantizer 12 by using a new quantization step size Q2.

A bit-rate controller 15 employs an algorithm selecting the appropriate requantization step size Q2 in order to satisfy the bit-rate R2 of the output bitstream, to thereby control the bit-rate. That is, a bit-rate control algorithm in accordance with the present invention is used at the bit-rate controller 15.

Hereinafter, the bit-rate reduction characteristics will be described in connection with a bit-rate converter which requantizes a bitstream, generated by encoding all of the macroblocks for each of I and P frames based on a fixed quantization step size Q1, by using the new quantization step size Q2, wherein Q2 is greater than Q1.

First of all, bit-rate reduction characteristics of an I frame will be explained.

Referring to FIGS. 2A to 2D, there are shown bit-rate reduction characteristics for an I frame of a "Flower Garden" image when a requantization for the I frame is performed. FIGS. 2A to 2D represent bit amounts generated by increasing the value of Q2 in case of Q1 having 4, 8, 12 and 17 for the I frame of the "Flower Garden", respectively.

FIGS. 3A to 3D describe bit-rate reduction characteristics for I frames of various images, respectively. Specifically, the drawings represent normalized bit rate Rr according to the change of the new quantization step size Q2 in case "Flower Garden", "People" and "Mobile and Calendar" are encoded in a same condition. Here, the normalized bit rate Rr is a ratio of the bit amount R2 corresponding to the new quantization step size Q2 to the bit amount R1 corresponding to the quantization step size Q1, wherein the normalized bit rate Rr is a positive value smaller than 1.

As illustrated in FIGS. 2A to 2D and FIGS. 3A to 3D, there is a piecewise linearly decreasing relationship between a bit rate generated by the requantization and a requantization step size and, for a given value of Q1, the bit rate rapidly decreases at a specific value of Q2 regardless of picture type.

Now, bit-rate reduction characteristics of a P frame will be explained.

Referring to FIGS. 4A to 4D, there are shown bit-rate reduction characteristics for P frames of various images, respectively.

They also provide requantization characteristics for the P frames of the various images. Although FIGS. 4A to 4D show similar characteristics to those illustrated in FIGS. 3A to 3D, since the quantization technique for the P frame is different from that for the I frame, the specific value of Q2 at which the bit rate corresponding to the given value of Q1 abruptly decreases is different from that in FIGS. 3A to 3D.

The bit-rate reduction characteristics occurring at the above requantization as shown above will be analyzed hereinafter.

First, if checking a reason why a bit amount rapidly decreases at a specific value of Q2, the reason is that the input bitstream, quantized by using the quantization step size Q1 and then coupled to the transcoder, is dequantized before being requantized and there exists a sufficiently large size of Q2 capable of setting the dequantized value to 0.

After all, if each block of 8×8 pixels is requantized by using the sufficiently large size of Q2, the number of 0s in the requantized block is suddenly increased. In the quantization matrix shown in FIG. 5, location coefficients having an identical weighting factor have identical quantization characteristics therebetween. That is, if the number of 0s is increased after the requantization being performed at a certain location coefficient, the number of 0s corresponding to the location coefficients having the same weighting factor as that of the certain location coefficient is also increased. Therefore, as shown in FIG. 5, the location coefficients having a same weighting factor are zig-zag scanned as one group. As a result, the number of consecutive 0s is rapidly increased so that an amount of bits generated by variable length coding is suddenly decreased.

In FIGS. 2A to 2D, 3A to 3D and 4A to 4D, the amount of bits is gradually decreased before being rapidly decreased since if the dequantized value is requantized, its requantized value is reduced to a value closer to 0 (but not 0) and, then, it is encoded through the use of the variable length coding.

Figure 6A:
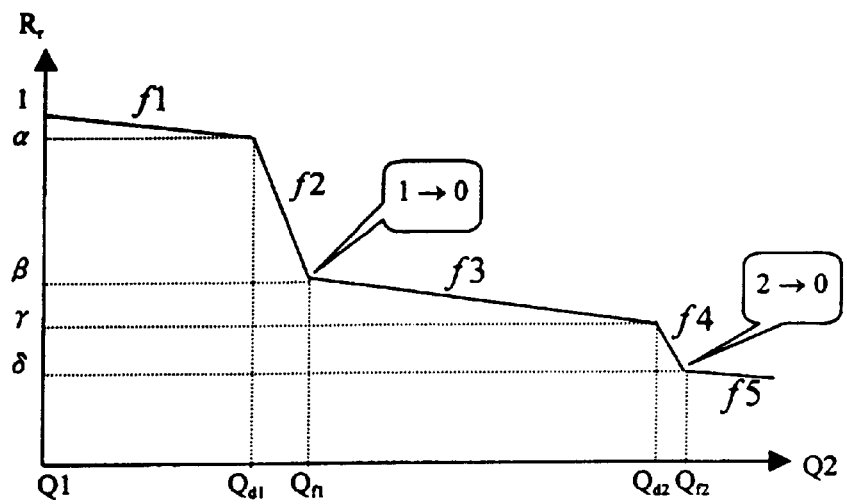
FIGS. 6A to 6C depict characteristics of a piecewise linearly decreasing model in accordance with the present invention, its mechanism and its requantization structure.
Figure 6B:
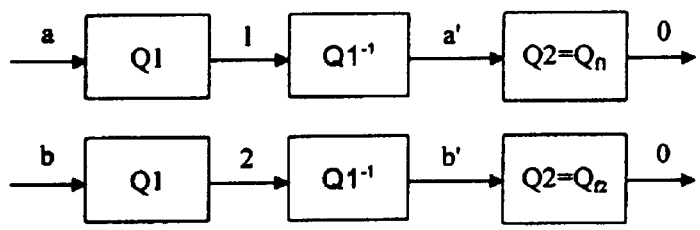

In conclusion, the bit-rate reduction characteristics of the requantization can be modelled as the piecewise linearly decreasing model as shown in FIGS. 6A and 6B. As can be seen in FIG. 6A showing a typical aspect of the bit-rate reduction characteristics of the requantization, there are two points where bit-rate is rapidly decreased: at the first abrupt reduction point, the value 1 shown in FIG. 6B is set to 0 by the requantization; and at the second abrupt reduction point, the value 2 shown in FIG. 6B is set to 0 by the requantization.

In the piecewise linearly decreasing model, the process for selecting a requantization step size abruptly reducing the bit-rate will be illustrated in detail.

In FIG. 5, a location (0, 1) represents a lowest AC frequency except for a DC component and has the value of 16 as a weighting factor. Therefore, it has substantial influence on the requantization process. Through the use of the requantization, typically, the number of 0s at the location (0,1) abruptly increases at points, $Q2=Q_{f1}$ and $Q2=Q_{f2}$ at which the amount of bits rapidly decreases.

In general, the increase of the number of 0s at the location (0,1) at which a discrete cosine transform (DCT) value is largest means that the number of 0s at the other locations whose DCT values are smaller than that of the location (0,1) also increase. After all, if a specific value of Q2 which increases the number of 0s at the location (0,1) is found, $Q_{f1}$ and $Q_{f2}$ are readily found. Hereinbefore, although the illustration is focused on an intra mode block, it can also be applied to an inter mode block.

Accordingly, at a given value of Q1, if a requantization step size Q2, satisfying the abrupt bit-rate reduction mechanism, is found for the weighting factor 16 of the location (0,1), $Q_{f1}$ and $Q_{f2}$ are easily determined. That is, $Q_{f1}$ and $Q_{f2}$ are determined by calculating a minimum value of Q2 which satisfies following inequalities EQ. 1 to EQ. 4 for the given value of Q1. In the equations, $Q_{d1}$ and $Q_{d2}$ are 1 smaller than $Q_{f1}$ and $Q_{f2}$, respectively.

Preferentially, for the I frame, the requantization step size which performs the abrupt bit-rate reduction is determined through the use of Eq. 1 and EQ. 2.

$$2 \cdot Q1 + \text{nint}(p \cdot Q2/q) < 2 \cdot Q2 \to Q_{f1} = \min(Q2) \ Q_{d1} = Q_{f1} - 1 \qquad \text{EQ. 1}$$

$$4 \cdot Q1 + \text{nint}(p \cdot Q2/q) < 2 \cdot Q2 \to Q_{f2} = \min(Q2) \ Q_{d2} = Q_{f2} - 1 \qquad \text{EQ. 2}$$

In addition, for the P frame, the requantization step size is decided by using following EQ. 3 and EQ. 4.

$$3 \cdot Q1 < 2 \cdot Q2 \to Q_{f1} = \min(Q2) \ Q_{d1} = Q_{f1} - 1 \qquad \text{EQ. 3}$$

$$5 \cdot Q1 < 2 \cdot Q2 \to Q_{f2} = \min(Q2) \ Q_{d2} = Q_{f2} - 1 \qquad \text{EQ. 4}$$

wherein nint($\cdot$) is a nearest integer operator and p and q are 3 and 4, respectively.

Figure 6C:
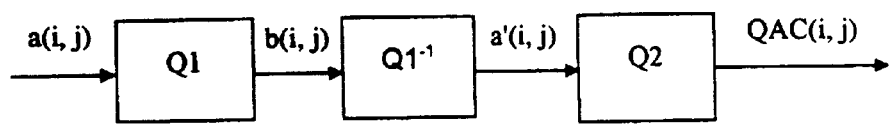

Hereinafter, referring to FIG. 6C, the process of obtaining the equations EQ. 1 to EQ. 4 will be described in detail.

Since all of the macroblocks of the I frame are encoded through the use of the intra mode encoding, their AC components are processed by the following dequantization and requantization algorithms as shown in the following EQs. 5 to 7. In the equations EQ. 5 and EQ. 6, w(i,j) represents a weighting factor at a location (i,j) of the quantization matrix shown in FIG. 5.

* Dequantization $$a'(i,j) = \text{int}(b(i,j) \cdot 2 \cdot Q1 \cdot w(i,j)/16) \qquad \text{EQ. 5}$$

* Requantization step 1

$$ac(i,j) = \text{nint}(16a'(i,j)/w(i,j)) \qquad \text{EQ. 6}$$

* Requantization step 2

$$QAC(i,j) = \text{int}((ac(i,j) + \text{sign}(ac(i,j)) \cdot \text{nint}((p \cdot Q2)/q))/(2 \cdot Q2)) \qquad \text{EQ. 7}$$

wherein int($\cdot$) is an integer operator and sign(x) which is an operator making x to −1 if x is a negative value, 1 if it is a positive value, and 0 if it is 0.

The reason for the first abrupt bit-rate reduction can be explained by the first block diagram of FIG. 6B. Therefore, by applying b(i,j)=1, QAC(i,j)=0 and w(i,j)=16 to EQ. 5 to EQ. 7, Q2 satisfying the equations is found and, thereafter, $Q_{f1}$ is determined. As a result, EQ. 1 is obtained. As shown in EQ. 1, $Q_{f1}$ is decided as a minimum value of Q2 by solving the left-side of the inequality EQ. 1 and $Q_{d1}$ is determined by subtracting 1 from $Q_{f1}$.

The reason for the second abrupt bit-rate reduction can be explained by the second block diagram of FIG. 6B. Consequently, by applying b(i,j)=2, QAC(i,j)=0 and w(i,j)=16 to EQ. 5 to EQ. 7, Q2 satisfying the equations is found and, thereafter, $Q_{f2}$ is determined. As a result, EQ. 2 is obtained. As shown in EQ. 2, $Q_{f2}$ is decided as a minimum value of Q2 by solving the left-side of the inequality EQ. 2 and $Q_{d2}$ is determined by subtracting 1 from $Q_{f2}$.

Since most of the macroblocks of the P frame are encoded through the use of the inter mode encoding, their AC components are processed by the following dequantization and requantization algorithms as shown in the following EQs. 8 to 10. In the equations EQ. 8 and EQ. 9, w(i,j) represents the weighting factor at the location (i,j) of the quantization matrix shown in FIG. 5. For the inter mode block, all of the weighting factors of the quantization matrix have an identical value, e.g., 16, regardless of their corresponding locations. That is, w(i,j) is 16.

* Dequantization $$a'(i,j) = \text{int}((2 \cdot b(i,j) + 1) \cdot Q1 \cdot w(i,j)/16) \qquad \text{EQ. 8}$$

* Requantization step 1

$$ac(i,j) = \text{nint}(16a'(i,j)/w(i,j)) \qquad \text{EQ. 9}$$

* Requantization step 2

$$QAC(i,j) = \text{int}(ac(i,j)/(2 \cdot Q2)) \qquad \text{EQ. 10}$$

The reason for the first abrupt bit-rate reduction can be explained by the first block diagram of FIG. 6B. Therefore, by applying b(i,j)=1, QAC(i,j)=0 and w(i,j)=16 to EQ. 8 to EQ. 10, Q2 satisfying the equations is found and, thereafter, $Q_{f1}$ is determined. As a result, EQ. 3 is obtained. As shown in EQ. 3, $Q_{f1}$ is decided as a minimum value of Q2 by solving the left-side of the inequality EQ. 3 and $Q_{d1}$ is determined by subtracting 1 from $Q_{f1}$.

The reason for the second abrupt bit-rate reduction can be explained by the second block diagram of FIG. 6B. Accordingly, by applying b(i,j)=2, QAC(i,j)=0 and w(i,j)=16 to EQ. 8 to EQ. 10, Q2 satisfying the equations is found and, thereafter, $Q_{f2}$ is determined. As a result, EQ. 4 is obtained. As shown in EQ. 4, $Q_{f2}$ is decided as a minimum value of Q2 by solving the left-side of the inequality EQ. 4 and $Q_{d2}$ is determined by subtracting 1 from $Q_{f2}$.

Meanwhile, the equations EQ. 1 and EQ. 2 for the I frame are applicable to the intra mode block and the equations EQ. 3 and EQ. 4 for the P frame are applicable to the inter mode block.

Among model parameters $\alpha, \beta, \gamma, \delta, Q_{f1}, Q_{f2}, Q_{d1}$ and $Q_{d2}$ described in FIG. 6A, $Q_{f1}, Q_{f2}, Q_{d1}$ and $Q_{d2}$ are calculated by using EQ. 1 to EQ. 4. As can be seen from the results shown in FIGS. 3A to 3D and FIGS. 4A to 4D, since the model parameters $\alpha, \beta, \gamma$ and $\delta$ have similar values regardless of the kinds of image sequences, it is assumed that the model parameters for the I and P frames are fixed as shown in the following EQ. 11 and EQ. 12, respectively.

$$\alpha = 0.85, \ \beta = 0.45, \ \gamma = 0.35, \ \delta = 0.30 \qquad \text{EQ. 11}$$

$$\alpha = 0.85, \ \beta = 0.40, \ \gamma = 0.30, \ \delta = 0.25 \qquad \text{EQ. 12}$$

The linear equations $f1, f2, f3, f4$ and $f5$ shown in FIG. 6A are as follows:

$$f1 : Rr = \frac{1 - \alpha}{Q_1 - Q_{d1}}(Q2 - Q1) + 1 \qquad \alpha \le Rr < 1 \qquad \text{EQ. 13}$$

$$f2 : Rr = \frac{\alpha - \beta}{Q_{d1} - Q_{f1}}(Q2 - Q_{d1}) + \alpha \qquad \beta \le Rr < \alpha \qquad \text{EQ. 14}$$

$$f3 : Rr = \frac{\beta - \gamma}{Q_{f1} - Q_{d2}}(Q2 - Q_{f1}) + \beta \qquad \gamma \le Rr < \beta \qquad \text{EQ. 15}$$

$$f4 : Rr = \frac{\gamma - \delta}{Q_{d2} - Q_{f2}}(Q2 - Q_{d2}) + \gamma \qquad \delta \le Rr < \gamma \qquad \text{EQ. 16}$$

$$f5 : Rr = \frac{\delta - 0.2}{Q_{f2} - 31}(Q2 - Q_{f2}) + \delta \qquad Rr < \delta \qquad \text{EQ. 17}$$

By applying Q2=31 to the above equations EQ. 2 and EQ. 4, Q1 is determined as Q1<10 and Q1<12.4, respectively. That means that the maximum value of Q1 guaranteeing the existence of $Q_{f2}$ is 9 for the intra mode macroblock and 12 for the inter mode macroblock.

Therefore, when Q1 for the intra mode macroblock is greater than 9 and Q1 for the inter mode macroblock is greater than 12, the linear equations $f1$, $f2$ and $f3$ exist and $f4$ and $f5$ do not exist. Moreover, $Q_{d2}$ of the linear equation $f3$ is substituted by 31 and $\gamma$ is exchanged for $\gamma$. That is, the linear equation $f3$ is changed as follows:

$$f3: Rr = \frac{\beta - \delta}{Q_{f1} - 31}(Q2 - Q_{f1}) + \beta \quad Rr < \beta \qquad \text{EQ. 18}$$

From now, referring to FIG. 7, the bit-rate control method in accordance with the present invention will be described in detail.

Figure 7:
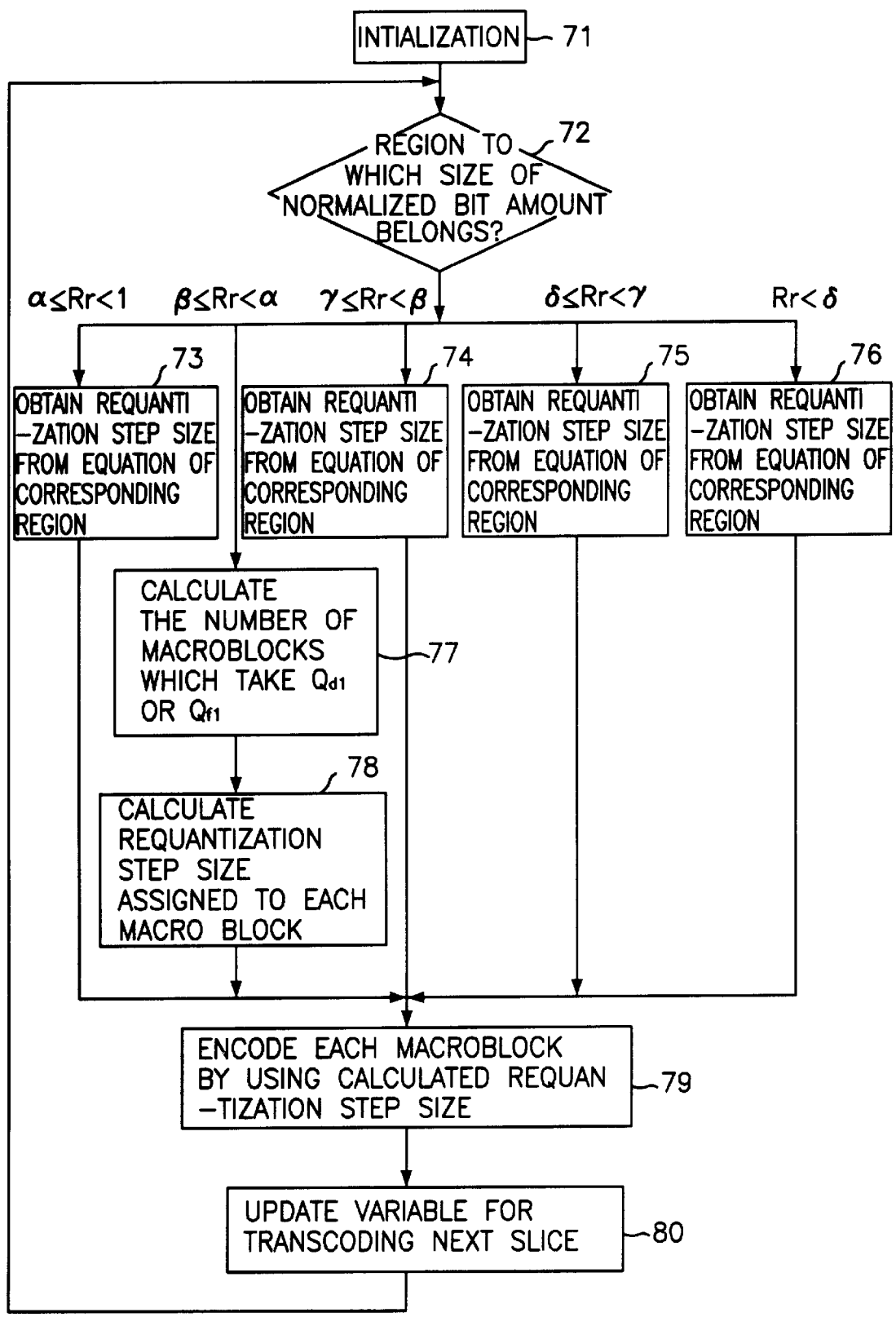
FIG. 7 shows a flow chart representing a bit-rate control method in accordance with the present invention.

In FIG. 7, there is shown a flow chart representing the bit-rate control method in accordance with the embodiment of the present invention.

The bit-rate for each frame is controlled on a slice-by-slice basis through the following processes. As explained in the drawing, one slice is encoded by performing one loop of the algorithm. The equations EQ. 1, EQ. 2 and EQ. 11 are used to encode a current macroblock which is to be encoded in the intra mode and the equations EQ. 3, EQ. 4 and EQ. 12 are used to encode the current macroblock which is to be encoded in the inter mode. It is assumed that one slice has M number of macroblocks.

For a first process, at a step 71, the normalized bit rate Rr is initialized to R2/R1 and a new target bit amount $B_T$ for current slice, is initialized to (Current_slice_bit×Rr), wherein R1 represents a bit-rate of a bitstream fed to the transcoder and R2 is a bit-rate of a bitstream output from the transcoder. The Current_slice_bit is obtained by counting the bit number of the slice fed to the transcoder.

For a second process, at a step 72, the region to which the size of the normalized bit rate Rr belongs is detected along the following procedure.

(a) At a step 73, if Rr is greater than or equal to $\alpha$ and smaller than 1, Q2 is obtained from the equation EQ. 13 and the process goes to a fifth process. At this time, Q1 in EQ. 13 is given from a sequence of the input bits and $Q_{d1}$ is calculated by using EQ. 1 or EQ. 3.

(b) If Rr is greater than or equal to $\beta$ and smaller than $\alpha$, the process moves to a third process.

(c) At a step 74, if Rr is greater than or equal to $\gamma$ and smaller than $\beta$, Q2 for each macroblock is ciphered by utilizing the equation EQ. 15 and the process goes to the fifth process. Here, $Q_{f1}$ is determined by using EQ. 15 and $Q_{d2}$ is obtained by using a corresponding equation among the equations EQ. 1 to EQ. 4.

However, if the macroblock belongs to the intra mode and Q1 is greater than 9, or the macroblock corresponds to the inter mode and Q1 is greater than 12, Q2 is decided by using EQ. 18 and the process proceeds to the fifth process.

(d) At a step 75, if Rr is greater than or equal to $\delta$ and smaller than $\gamma$, Q2 for each macroblock is computed by using the equation EQ. 16 and the process goes to the fifth process. At this time, $Q_{f2}$ is determined by using EQ. 16 and $Q_{d2}$ is obtained by using EQ. 2 or EQ. 4.

However, if the macroblock belongs to the intra mode and Q1 is greater than 9, or the macroblock corresponds to the inter mode and Q1 is greater than 12, Q2 is calculated from EQ. 18 and the process goes to the fifth process.

(e) At a step 76, if Rr is smaller than $\delta$, Q2 for each macroblock is obtained from the equation EQ. 17 and the process moves to the fifth process. Here, $Q_{f2}$ is determined from EQ. 17 and $Q_{d2}$ is calculated by using EQ. 2 or EQ. 4.

However, if the macroblock belongs to the intra mode and Q1 is greater than 9, or the macroblock corresponds to the inter mode and Q1 is greater than 12, Q2 is decided by using EQ. 18 and the process proceeds to the fifth process.

For the third process, at a step 77, the number of macroblocks taking $Q_{d1}$ as Q2, i.e., Number_of_$Q_{d1}$, and the number of macroblocks choosing $Q_{f1}$ as Q2, i.e., Number_of_$Q_{f1}$, are calculated by using the following equation EQ. 19.

$$Numberof\_Q_{d1} = nint\left[\frac{M}{(\alpha - \beta)} \times (Rr - \beta)\right] \qquad \text{EQ. 19}$$

$$Numberof\_Q_{f1} = M - Numberof\_Q_{d1}$$

wherein nint($\cdot$) represents a nearest integer operator. $Q_{d1}$ and $Q_{f1}$ are appropriately distributed to each of the macroblocks in order to uniformly maintain the image quality in a slice. For instance, if M=10, Number_of_$Q_{d1}$=3 and Number_of_$Q_{f1}$=7, $Q_{d1}$ and $Q_{f1}$ are properly assigned to each of the macroblocks as follows:

[$Q_{f1}(1)$ $Q_{f1}(2)$ $Q_{d1}(3)$ $Q_{f1}(4)$ $Q_{f1}(5)$ $Q_{d1}(6)$ $Q_{f1}(7)$ $Q_{f1}(8)$ $Q_{d1}(9)$ $Q_{f1}(10)$]

wherein $Q_{f1}(n)$ means that Q2 of an nth macroblock is substituted with $Q_{f1}$. Then, the process goes to a fourth process.

For the fourth process, at a step 78, Qf1 or Qd1, assigned to each of the macroblocks as Q2, is calculated by using EQ. 1 or EQ. 3 and, then, the process moves to the fifth process.

For the fifth process, at step 79, each of the macroblocks is requantized by using Q2 assigned thereto and encoded. As a result, a bit amount $B_G$ is obtained. If the fifth process is finished, the bit-rate control for one slice is practically completed. A bit amount $B_D$ deviated from the bit amount $B_T$ is computed by subtracting $B_G$ from $B_T$. During the following the above processes, a next slice is input to the transcoder and the bit number of the next slice Next_slice_bit is obtained at this time. Then, the process goes to a sixth process.

For the sixth process, at a step 80, a variable for transcoding the next slice is updated as described in the following EQs. 20 and 21.

$$Rr = \frac{Rr \times Next\_slice\_bit + B_D}{Next\_slice\_bit} \qquad \text{EQ. 20}$$

$$B_T = Next\_slice\_bit \times Rr \qquad \text{EQ. 21}$$

Then, in order to transcode the next slice, the process is fed back to the second process. The structure of the above algorithm requires a substantially reduced burden of computation compared with the conventional TM5 method since it is based on a reliable model. When transcoding video data by using the inventive algorithm and the conventional TM5 method, their performance will be compared hereinafter through mock experiments.

* Conditions of a first mock experiment test image: "Susie" image whose GOP (group of picture) size is 12 and which is processed on a unit of 30 frames/sec., each frame having 352×240 pixels in an SIF (source input formal) format.

bit-rate converting condition: R1=0.6 Mbps, R2=0.36 Mbps (40% reduced bit-rate)

Figure 8:
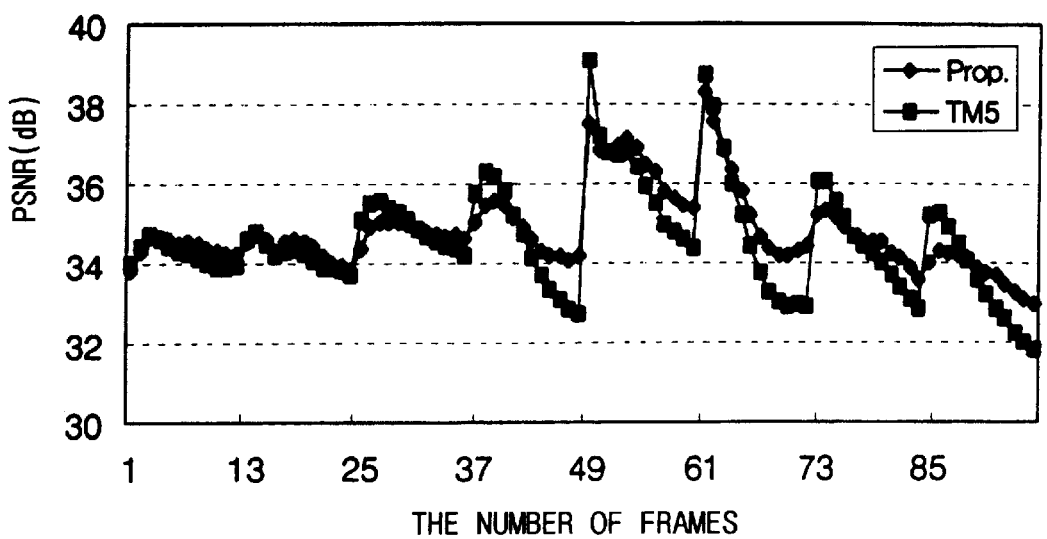
FIG. 8 illustrates a diagram comparing a peak signal to noise ratio (PSNR) of a TM5 method with that of a bit-rate control method of the present invention in a first mock experiment.

Referring to FIG. 8, there is illustrated a diagram comparing a PSNR of the TM5 method with that of a bit-rate reduction method of the present invention in the first sham experiment. That is, it represents a PSNR of transcoded image data when its bit-rate is controlled by the present invention and the TM5 method.

As described in FIG. 8, the PSNR in accordance with the present invention is uniformly good. Specifically, the latter half of the GOP shows an advanced PSNR.

Figure 9:
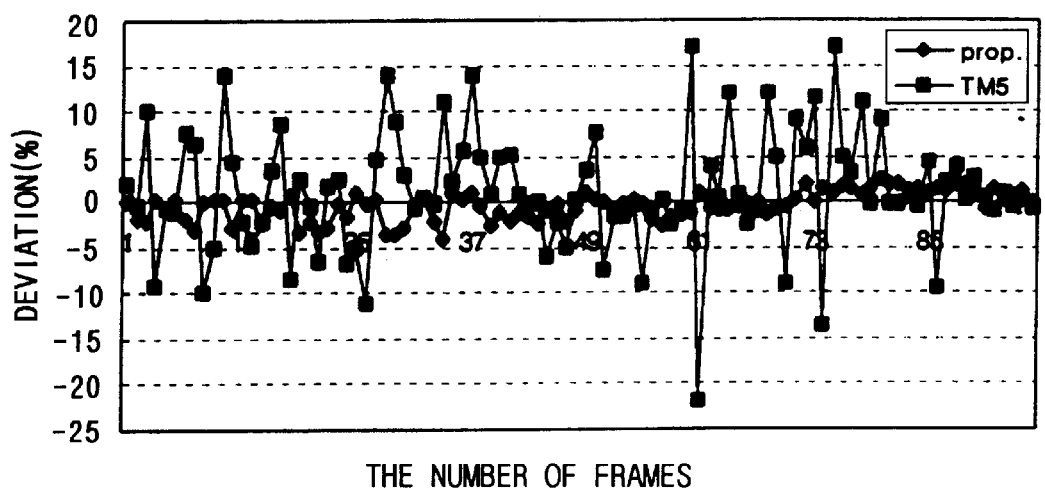
FIG. 9 describes a diagram comparing a deviation percentage of the TM5 method with that of the bit-rate control method of the present invention in the first mock experiment.

In FIG. 9, there is represented a diagram comparing a deviation percentage of the TM5 method with that of the bit-rate reduction method of the present invention in the first sham experiment. It shows how much deviated from a target bit amount the bit amount is, the bit amount being generated by controlling the bit-rates in the present invention and the TM5 method. As shown in FIG. 9, while the deviation percentage due to the present invention is concentrated on around 0%, that of the TM5 method is substantially high.

* conditions of a second mock experiment test image: "Table Tennis" image whose GOP size is 12 and which is processed on the unit of 30 frames/sec., each frame having 720×480 pixels in a CCIR601 format.

bit-rate converting condition: R1=10 Mbps, R2=6.5 Mbps (35% reduced bit-rate)

Figure 10:
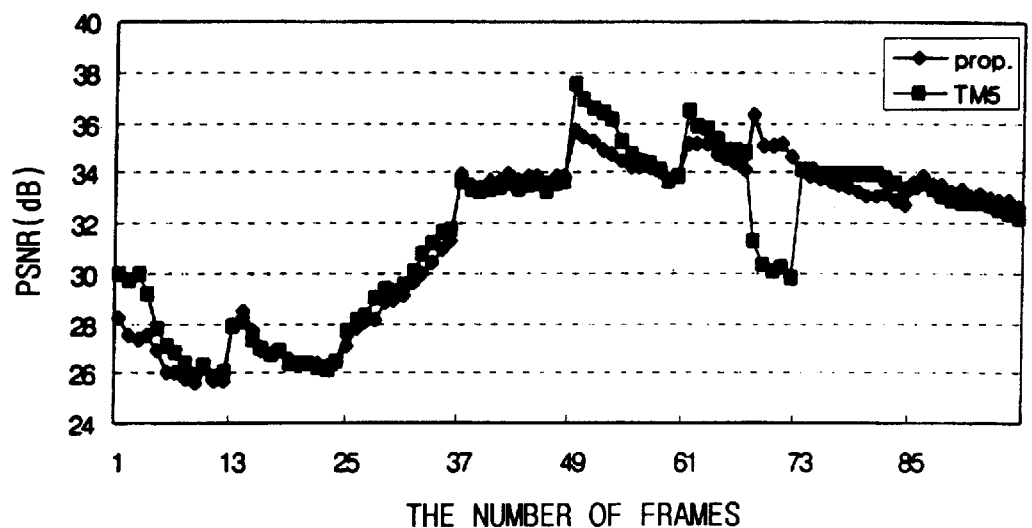
FIG. 10 represents a diagram comparing a PSNR of the TM5 method with that of the bit-rate control method of the present invention in a second mock experiment.

In the second experiment, something remarkable is that the original bitstream is encoded by a scene adaptive bit-rate control method for MPEG-2 video coding. We referred to the method proposed in VCIP '97(M. J. Lee et al., "Scene adaptive bit-rate control method in MPEG video coding", *Proc. SPIE VCIP*, San Jose, Calif., pp. 1406–1411, February 1997) as the scene adaptive rate control algorithm. Scene change occurs at the 68-th frame of "Table Tennis" sequence. Referring to FIG. 10, there is shown the PSNR comparison of the sequence transcoded by the proposed invention and the TM5 method. As shown, the picture quality by the TM5 method is severely deteriorated after a scene change. On the contrary, the proposed invention can prevent this critical problem implicitly. The reason for this fact is that the proposed invention makes use of an a priori knowledge of the quantization step size Q1. One of the limitations of the Tm5 method is that it is not designed to incorporate information on Q1 that is available from the input bit stream into a rate control procedure. On the contrary, the piecewise linearly decreasing model is based on a priori knowledge of Q1 and there is a piecewise linear relationship between Q1 and Q2. Because Q2 still preserves the characteristics of Q1 implicitly, the effect of the scene adaptive rate control coding technique is still preserved after a transcoding coder. This fact avoids additional steps of implementation for a scene adaptive rate control in the transcoding method. This is one of the noticeable advantages over the TM5 method.

Figure 11:
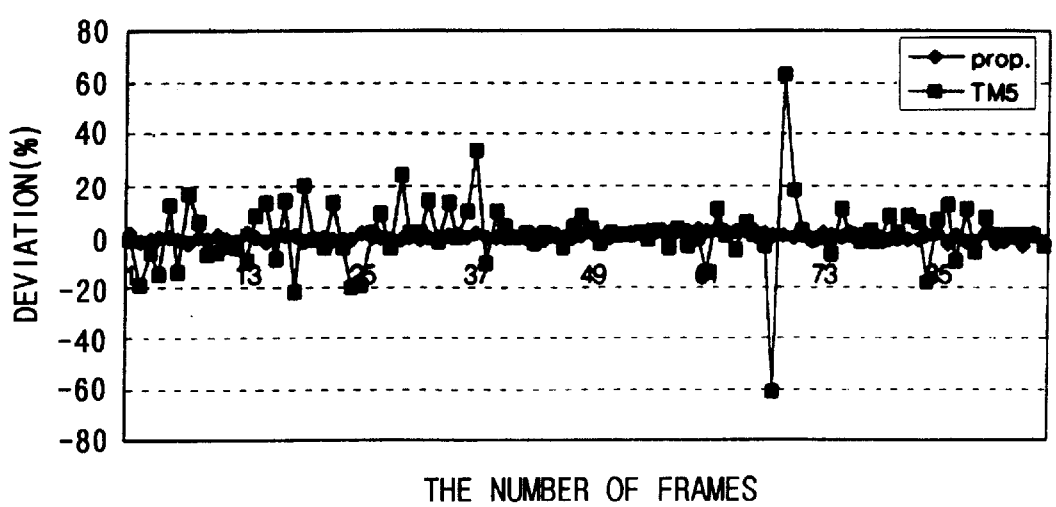
FIG. 11 provides a diagram comparing the deviation percentage of the TM5 method with that of the bit-rate control method of the present invention in the second mock experiment.

Referring to FIG. 11, there is provided a diagram comparing the deviation percentage of the TM5 method with that of the bit-rate control method of the present invention in the second experiment. As can be seen from FIG. 11, while the deviation percentage due to the inventive algorithm is concentrated on around 0%, that of the TM5 method is substantially high. Specifically, since the deviation percentage at the frame in which the scene change happens is high, the TM5 method cannot play a great role as the bit-rate controller.

Meanwhile, it is necessary that the bit-rate control method has a simplest algorithm in order to achieve a real time transcoding. Therefore, the present invention illustrated above can be used as an effective bit-rate control method in a transcoding environment.

While the present invention has been described with respect to certain preferred embodiments only, other modifications and variations may be made without departing from the spirit and scope of the present invention as set forth in the following claims.

What is claimed is:

1. A method of selecting a requantization step size, comprising:

(a) deciding a minimum value of a requantization step size Q2, satisfying 2·Q1+nint(p·Q2/q)<2·Q2 for a quantization step size Q1 of a coded image block of a video image, as quantization step size information;

(b) determining a minimum value of a requantization step size Q2, satisfying 4·Q1+nint(p·Q2/q)<2·Q2 for the quantization step size Q1 of the coded image block, as the requantization step size information;

(c) taking a minimum value of a requantization step size Q2, satisfying 3·Q1<2·Q2 for the quantization step size Q1 of the coded image block, as the requantization step size information; and (d) choosing a minimum value of a requantization step size Q2, satisfying 5·Q1<2·Q2 for the quantization step size Q1 of the coded image block, as the requantization step size information, wherein nint(·) is a nearest integer operator and p and q represent positive integers, respectively.

2. The method as recited in claim 1, further comprising the step of:

(e) redetermining the requantization step size information by subtracting a predetermined value from the requantization step size information determined in the preceding steps.

3. The method as recited in claim 2, wherein the predetermined value is 1.

4. A method for use in a bit-rate controller, of controlling a bit-rate, comprising:

(a) initializing a variable and detecting a region to which a normalized bit rate for an input image belongs;

(b) calculating requantization step size information by using each linear equation according to the detecting result of the step (a) based on quantization step size information Q1 of the input image;

(c) requantizing and encoding each of macroblocks based on the requantization step size information assigned to said each macroblocks;

(d) updating the variable for a following slice and then repeating the steps of (a) to (c);

wherein the initializing step (a) comprises:

(a1) initializing the normalized bit rate Rr to a value obtained by dividing a bit-rate R2 of an output bitstream by a bit-rate R1 of an input bitstream; and (a2) initializing a bit rate $B_T$ targeted by requantization to a value determined by multiplying a current slice bit number current_slice_bit by the normalized bit rate Rr.

5. The method of one of claim 4, wherein the step (b) comprises:

(b1) if the normalized bit rate Rr is smaller than a first preset value and greater than or equal to a second preset value αin conformity with the detecting result of the step (a), determining the requantization step size information for each of the macroblocks by using a corresponding linear equation $$Rr = \frac{1-\alpha}{Q1-Q_{dI}}(Q2-Q1)+1;$$

(b2) if the normalized bit rate Rr is smaller than the second preset value α and greater than or equal to a third preset value $\beta$ in conformity with the detecting result of the step (a), calculating the number of macroblocks taking $Q_{d1}$ or $Q_{f1}$ as the requantization step size and determining the requantization step size information for each of the macroblocks;

(b3) if the normalized bit rate Rr is smaller than the third preset value $\beta$ and greater than or equal to a fourth preset value $\gamma$ in conformity with the detecting result of the step (a), determining the requantization step size information for each of the macroblocks by using a corresponding linear equation $$Rr = \frac{\beta - \gamma}{Q_{fl} - Q_{d2}}(Q2 - Q_{fl}) + \beta$$

or $$Rr = \frac{\beta - \delta}{Q_{fl} - 31}(Q2 - Q_{fl}) + \beta;$$

(b4) if the normalized bit rate Rr is smaller than the fourth preset value $\gamma$ and greater than or equal to a fifth preset value $\delta$ in conformity with the detecting result of the step (a), determining the requantization step size information for each of the macroblocks by using a corresponding linear equation $$Rr = \frac{\gamma - \delta}{Q_{d2} - Q_{f2}}(Q2 - Q_{d2}) + \gamma$$

or $$Rr = \frac{\beta - \delta}{Q_{fl} - 31}(Q2 - Q_{fl}) + \beta;$$

and (b5) if the normalized bit rate Rr is smaller than the fifth preset value $\delta$ in conformity with the detecting result of the step (a), determining the requantization step size information for each of the macroblocks by using a corresponding linear equation $$Rr = \frac{\delta - 0.2}{Q_{f2} - 31}(Q2 - Q_{f2}) + \delta$$

or $$Rr = \frac{\beta - \delta}{Q_{fl} - 31}(Q2 - Q_{fl}) + \beta$$

wherein $Q_{f1}$ and $Q_{f2}$ are requantization step sizes which cause a first abrupt bit rate reduction and second abrupt bit rate reduction; $Q_{d1}$ and $Q_{d2}$ are requantization step sizes which have a value (=$Q_{f1}$-1), respectively.

6. The method of claim 5, further comprising:

(e) calculating a bit rate $B_G$ produced after performing the step (c);

(f) computing a bit rate $B_D$ deviated from the bit rate $B_T$ by subtracting $B_G$ from $B_T$; and (g) detecting a next slice bit number next_slice_bit.

7. The method of claim 6, wherein the first to the fifth preset values are 1, 0.85($\alpha$), 0.45($\beta$), 0.35($\gamma$) and 0.30($\delta$), respectively, if one of the macroblocks is an intra mode block.

8. The method of claim 6, wherein the first to the fifth preset values are 1, 0.85($\alpha$), 0.40($\beta$), 0.30($\gamma$) and 0.25($\delta$), respectively, if one of the macroblocks is an inter mode block.

9. The method of claim 5, further comprising using a bit-rate controller employing the bit-rate control method in a transcoder.

* * * * *